United States Patent
Soejima

(10) Patent No.: US 11,639,238 B2
(45) Date of Patent: May 2, 2023

(54) VEHICLE-BODY CARRYING APPARATUS

(71) Applicant: SUBARU CORPORATION, Tokyo (JP)

(72) Inventor: Hideki Soejima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 309 days.

(21) Appl. No.: 17/060,342

(22) Filed: Oct. 1, 2020

(65) Prior Publication Data

US 2021/0130007 A1    May 6, 2021

(30) Foreign Application Priority Data

Nov. 1, 2019    (JP) .............................. JP2019-199526

(51) Int. Cl.
*B64F 5/60*    (2017.01)
*G01M 7/02*    (2006.01)
*G01M 17/00*    (2006.01)
*B64F 1/22*    (2006.01)
*A45C 13/00*    (2006.01)
*A45C 13/02*    (2006.01)

(52) U.S. Cl.
CPC .............. *B64F 1/22* (2013.01); *A45C 13/001* (2013.01); *A45C 13/02* (2013.01); *B64F 5/60* (2017.01); *G01M 7/022* (2013.01); *G01M 7/027* (2013.01); *G01M 17/00* (2013.01)

(58) Field of Classification Search
CPC . B64F 5/60; B64F 1/22; A45C 13/001; A45C 13/02; G01M 7/022; G01M 7/027; G01M 17/00

USPC .................................................... 73/571, 583
See application file for complete search history.

(56) References Cited

U.S. PATENT DOCUMENTS

| 9,718,564 | B1 * | 8/2017 | Beckman ................ B61L 23/00 |
| 11,174,045 | B2 * | 11/2021 | Gil ............................ B64F 1/04 |
| 2017/0129464 | A1 | 5/2017 | Wang et al. |
| 2017/0283090 | A1 | 10/2017 | Miller et al. |
| 2017/0328513 | A1 | 11/2017 | Davis et al. |
| 2018/0245365 | A1 | 8/2018 | Wankewycz |

(Continued)

FOREIGN PATENT DOCUMENTS

| JP | 2017-518917 A | 7/2017 |
| JP | 2018-128278 A | 8/2018 |
| WO | 2020/232352 A1 | 11/2020 |

OTHER PUBLICATIONS

Extended European Search Report issued in corresponding European Patent Application No. 20199810.1-1010, dated Mar. 24, 2021.

*Primary Examiner* — Lisa M Caputo
*Assistant Examiner* — Rose M Miller
(74) *Attorney, Agent, or Firm* — McDermott Will & Emery LLP

(57) ABSTRACT

A vehicle-body carrying apparatus is configured to house and carry a vehicle body of an unmanned vehicle. The apparatus includes a housing, a data collecting device, a diagnostic device, and an informing device. The housing is capable of housing the vehicle body. The data collecting device is configured to collect data relating to structural soundness of the vehicle body housed in the housing. The diagnostic device is configured to diagnose the structural soundness of the vehicle body based on the collected data. The informing device is configured to inform a user of a diagnostic result obtained by the diagnostic device.

14 Claims, 3 Drawing Sheets

(56) References Cited

U.S. PATENT DOCUMENTS

| | | | |
|---|---|---|---|
| 2019/0263538 A1* | 8/2019 | O'Brien | H02J 7/0013 |
| 2020/0290752 A1* | 9/2020 | Kolosiuk | B60L 53/16 |
| 2021/0276735 A1* | 9/2021 | Raptopoulos | G08G 5/025 |

* cited by examiner

VEHICLE-BODY CARRYING APPARATUS

CROSS-REFERENCE TO RELATED APPLICATIONS

The present application claims priority from Japanese Patent Application No. 2019-199526 filed on Nov. 1, 2019, the entire contents of which are hereby incorporated by reference.

BACKGROUND

The disclosure relates to vehicle-body carrying apparatuses, or more particularly relates to a vehicle-body carrying apparatus capable of housing and carrying a vehicle body of an unmanned vehicle.

In recent years, various unmanned vehicles including drones are developed in respective fields in the air, on the ground, and over the sea (including the underwater field).

Moreover, for example, for an unmanned aerial vehicle (UAV), a base station or the like where a battery pack of the UAV can be automatically replaced with another battery pack is developed (see Japanese Unexamined Patent Application Publication (Translation of PCT Application) No. 2017-518917).

SUMMARY

An aspect of the disclosure provides a vehicle-body carrying apparatus configured to house and carry a vehicle body of an unmanned vehicle. The vehicle-body carrying apparatus includes a housing, a data collecting device, a diagnostic device, and an informing device. The housing is capable of housing the vehicle body. The data collecting device is configured to collect data relating to structural soundness of the vehicle body housed in the housing. The diagnostic device is configured to diagnose the structural soundness of the vehicle body on a basis of the collected data. The informing device is configured to inform a user of a diagnostic result obtained by the diagnostic device.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to explain the principles of the disclosure.

DETAILED DESCRIPTION

A vehicle body of an unmanned vehicle may frequently hit the ground, an obstacle, or the like, during flying or traveling and may be damaged. Mainly a user has manually performed an inspection relating to the soundness of the structure of the vehicle body (that is, whether the vehicle body is non-damaged).

However, in many cases, such an inspection is a troublesome work, and a person who has knowledge of the unmanned vehicle inspects the unmanned vehicle before flying.

It is desirable to provide a vehicle-body carrying apparatus capable of reducing the troublesome work of a user and automatically diagnosing the structural soundness of an unmanned vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

The description is given below in a case where an object to be carried while being housed in the vehicle-body carrying apparatus according to the embodiment of the disclosure is a drone-shaped unmanned aerial vehicle. However, the vehicle-body carrying apparatus according to the embodiment of the disclosure may be applied to an airplane-shaped unmanned aerial vehicle, an underwater drone, or the like. The vehicle-body carrying apparatus is simply a portable unmanned vehicle and is not limited to a specific object.

Figure 1:
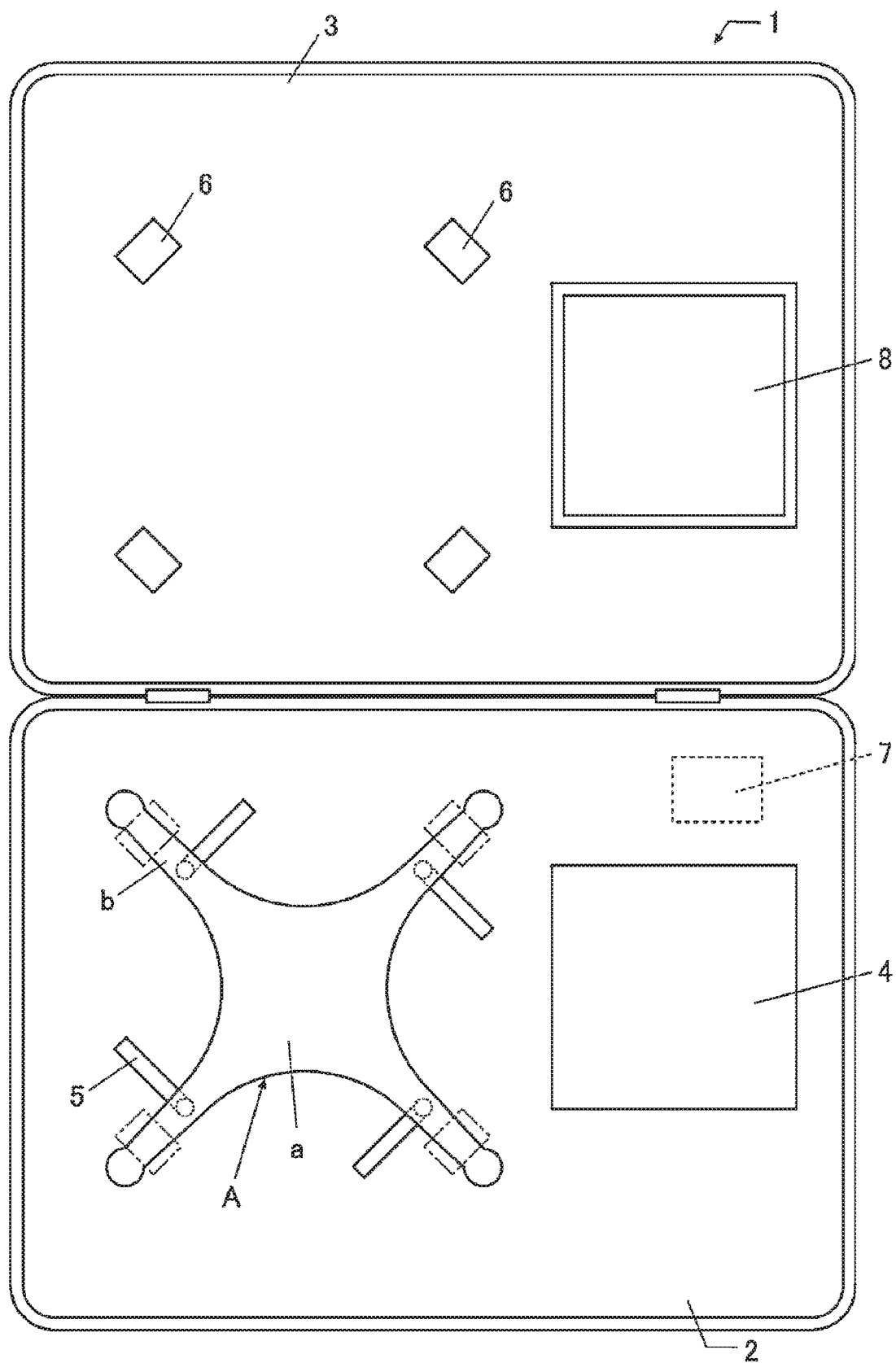
FIG. 1 illustrates a state in which a case-shaped vehicle-body carrying apparatus according to an embodiment is open.
Figure 2:
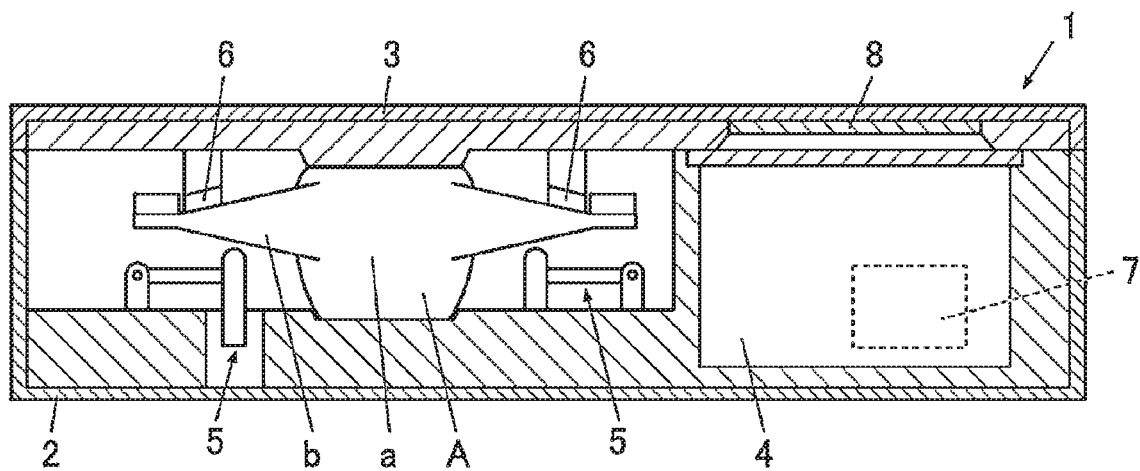
FIG. 2 is a cross-sectional view from a side surface of the vehicle-body carrying apparatus illustrated in FIG. 1.

FIG. 1 illustrates a state in which a case-shaped vehicle-body carrying apparatus according to an embodiment is open. FIG. 2 is a cross-sectional view from a side surface of the vehicle-body carrying apparatus illustrated in FIG. 1.

In the embodiment, a vehicle-body carrying apparatus 1 is case-shaped, and can house and carry a vehicle body A of an unmanned vehicle.

The vehicle-body carrying apparatus 1 includes a housing 2 capable of housing the vehicle body A of the unmanned vehicle, and a lid 3.

The housing 2 has a housing space 4 configured to house components such as blades of the unmanned vehicle and a battery next to a space configured to house the vehicle body A of the unmanned vehicle. The housing space 4 can be provided at an appropriate position in the vehicle-body carrying apparatus 1.

Moreover, in the embodiment, a main body a of the unmanned vehicle is sandwiched between an inner structure of the housing 2 and an inner structure of the lid 3 when the lid 3 of the vehicle-body carrying apparatus 1 is closed. Since the main body a is sandwiched, the position of the vehicle body A of the unmanned vehicle is fixed in the vehicle-body carrying apparatus 1.

Moreover, in the embodiment, hammering is performed against the vehicle body A housed in the housing 2 of the vehicle-body carrying apparatus 1 (in this case, an arm b of the unmanned vehicle), and data of vibration generated in the vehicle body A is collected. The data of the vibration serves as data relating to the structural soundness of the vehicle body A.

In the vehicle-body carrying apparatus 1, a hammer 5 is disposed in the housing 2, as a data collecting device configured to collect data of vibration of the vehicle body A housed in the housing 2 (that is, data relating to the structural soundness).

The hammer 5 is disposed at a position corresponding to the vehicle body A, that is, in this case, at a position corresponding to an arm b of the unmanned vehicle. In response to an instruction of a diagnostic device 7 (described later), the hammer 5 performs hammering against the vehicle body A, in this case, to add vibration to the vehicle body A, from below in FIG. 1, that is, to the arm b of the unmanned vehicle from below to generate vibration in the arm b.

Although not illustrated, an actuator and other components are disposed in the housing 2 to move the hammer 5 upward. While FIGS. 1 and 2 illustrate a case where hammers 5 are provided for respective arms b of the unmanned vehicle. However, for example, a hammer 5 may perform hammering against the four arms b.

In the lid 3, sensors 6 are disposed as a data collecting device at positions corresponding to the vehicle body A, that is, at positions corresponding to the arms b of the unmanned vehicle. The sensors 6 come into contact with the vehicle body A, that is, the arms b of the unmanned vehicle in a state in which the lid 3 is closed.

The sensors 6 measure the vibration generated in the vehicle body A, that is, in the arms b of the unmanned vehicle with the hammers 5 in response to an instruction of the diagnostic device 7 (described later) and transmit the measured vibration to the diagnostic device 7. The sensors 6 are simply ones capable of detecting vibration generated in the vehicle body A. The sensors 6 may be acceleration sensors, velocity sensors, or the like.

The vehicle-body carrying apparatus 1 includes the diagnostic device 7 that diagnoses the structural soundness of the vehicle body A based on the collected data. The diagnostic device 7 may be a general-purpose computer. Alternatively, the diagnostic device 7 may be a dedicated device.

Moreover, FIGS. 1 and 2 illustrate a case where the diagnostic device 7 is provided in the housing 2. However, the diagnostic device 7 may be provided in the lid 3. How the diagnostic device 7 performs a diagnosis will be described later.

In the lid 3 of the vehicle-body carrying apparatus 1, an informing device 8 is provided to inform a user of the diagnostic result obtained by the diagnostic device 7, that is, whether the vehicle body A is structurally sound. In the embodiment, the informing device 8 includes a display such as a liquid crystal display.

Alternatively, the diagnostic result obtained by the diagnostic device 7 may be informed, for example, by voice. The informing device 8 may be provided in the housing 2, or may be provided in an outer surface of either one of the lid 3 and the housing 2. The diagnostic result may be transmitted from the diagnostic device 7 to a smartphone or the like of the user, and the smartphone or the like may serve as the informing device 8 to inform the user of the diagnostic result.

In the embodiment, the hammers 5 perform hammering against the vehicle body A, that is, the arms b of the unmanned vehicle to generate vibration, the sensors 6 measure the generated vibration to obtain data, and the diagnostic device 7 receives the obtained data. When receiving the obtained data transmitted from the sensors 6, the diagnostic device 7 performs Fourier transform on the data of the vibration to perform spectrum analysis, and diagnoses whether the vehicle body A has structural soundness (that is, whether the vehicle body A is structurally sound) based on the obtained frequency spectrum.

In this case, the hammers 5 may perform hammering against the arms b of the unmanned vehicle five times per arm b, the obtained values may be averaged, and then the averaged value may be subjected to Fourier transform. In addition, when hammering is performed a plurality of times, the vibrating point (the hammering point) may be moved.

A specific method of diagnosing the structural soundness of the vehicle body A can include, for example, performing hammering at the shipment of the unmanned vehicle from the factory or at the start of use of the unmanned vehicle to obtain a frequency spectrum, and comparing a frequency spectrum obtained at the diagnosis performed by the diagnostic device 7 with the frequency spectrum at the shipment from the factory or the like.

Moreover, samples of frequency spectra when the vehicle body A is damaged, for example, when the vehicle body A of the unmanned vehicle has a crack and when the vehicle body A of the unmanned vehicle is deformed can be stored in advance in the diagnostic device 7, and the frequency spectrum obtained at the diagnosis can be compared with the samples. Thus, the structural soundness of the vehicle body A can be diagnosed.

Furthermore, for example, data of frequency spectra when the vehicle body A of another unmanned vehicle of the same type can be collected in a data center or the like, and the frequency spectrum obtained at the diagnosis can be compared with the collected data. Alternatively, it can be diagnosed whether the frequency spectrum obtained at the diagnosis has the feature of a frequency spectrum extracted from the collected data. Thus, the structural soundness of the vehicle body A can be diagnosed.

When it is diagnosed that the vehicle body A is not structurally sound as the result of the diagnosis, the diagnostic device 7 causes the informing device 8 to inform the user of that the vehicle body A is not structurally sound or that the vehicle body A is damaged, by display or voice.

When it is diagnosed that the vehicle body A is structurally sound as the result of the diagnosis, the diagnostic device 7 can cause the informing device 8 to inform the user of that the vehicle body A is structurally sound.

Regarding the timing at which the structural soundness of the vehicle body A housed in the housing 2 of the vehicle-body carrying apparatus 1 is diagnosed, immediately after the vehicle body A is housed in the housing 2 and the lid 3 is closed, or when the user carries the vehicle-body carrying apparatus 1 in the state in which the vehicle body A is housed, the vibration of the vehicle-body carrying apparatus 1 is added in addition to the vibration which is generated as the result of the hammers 5 adding vibration to the vehicle body A. This may affect the obtained frequency spectrum.

Thus, for example, in a state in which the hammers 5 do not add vibration to the vehicle body A (for example, the arms b of the unmanned vehicle), based on the data output from the sensors 6 that are in contact with the vehicle body A, the diagnostic device 7 can diagnose the structural soundness of the vehicle body A when it is ensured that vibration is not generated in the vehicle-body carrying apparatus 1 or the like.

When the structural soundness of the vehicle body A can be appropriately diagnosed even when the vehicle-body carrying apparatus 1 is vibrated to a certain extent, the diagnosis can be performed while the user carries the vehicle-body carrying apparatus 1.

As described above, with the vehicle-body carrying apparatus 1 according to the embodiment, the data to be used for diagnosing the structural soundness of the vehicle body A is automatically collected and diagnosed. That is, the structural soundness is automatically diagnosed merely by housing the vehicle body A of the unmanned vehicle in the vehicle-body carrying apparatus 1 instead of the user diagnosing the structural soundness of the vehicle body A. Thus, the troublesome work of the user can be reduced.

Moreover, the vehicle body A is periodically diagnosed in this way, and when the structural soundness of the vehicle body A is lost (for example, when the vehicle body A is damaged), the user is informed of that situation. Thus, the user can perform maintenance and repair of the vehicle body A, and replacement of a component.

Modifications

While the case of performing hammering against the arms b of the unmanned vehicle has been described in the embodiment, hammering may be performed against the main body a of the unmanned vehicle.

In this case, as illustrated in FIG. 2, when the main body a of the unmanned vehicle is sandwiched between the inner structure of the housing 2 and the inner structure of the lid 3, the main body a is unlikely to be vibrated. For example, as illustrated in FIG. 3, the entirety of the unmanned vehicle can be sandwiched between foamed members 9 of the housing 2 and the lid 3 so that the position of the unmanned vehicle is fixed in the vehicle-body carrying apparatus 1, and the hummers 5 can be disposed in cut and removed portions of the foamed members 9 to add vibration to the main body a of the unmanned vehicle.

Figure 3:
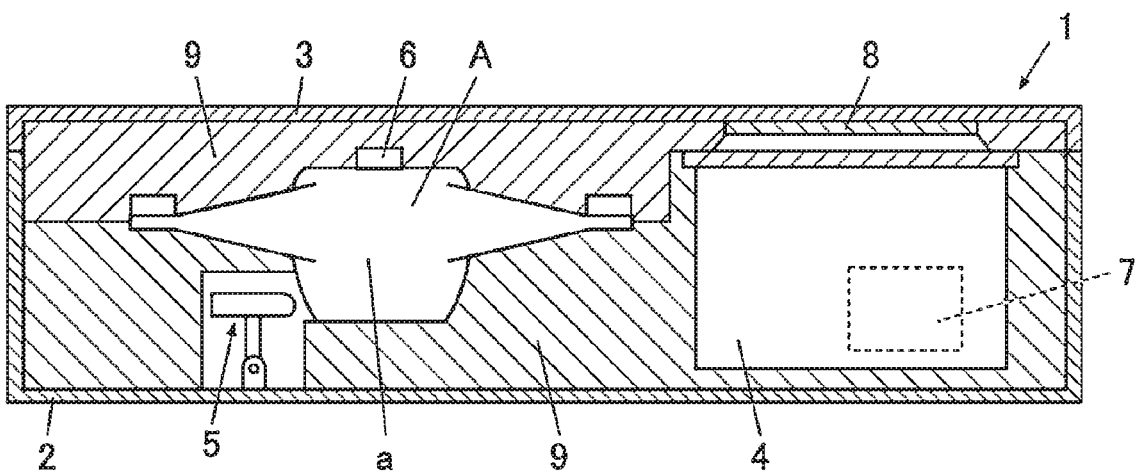
FIG. 3 illustrates a configuration example in which the entirety of an unmanned vehicle is sandwiched between foamed members.

Although not illustrated in FIG. 3, hammering may be also performed against the arms b of the unmanned vehicle.

Figure 4:
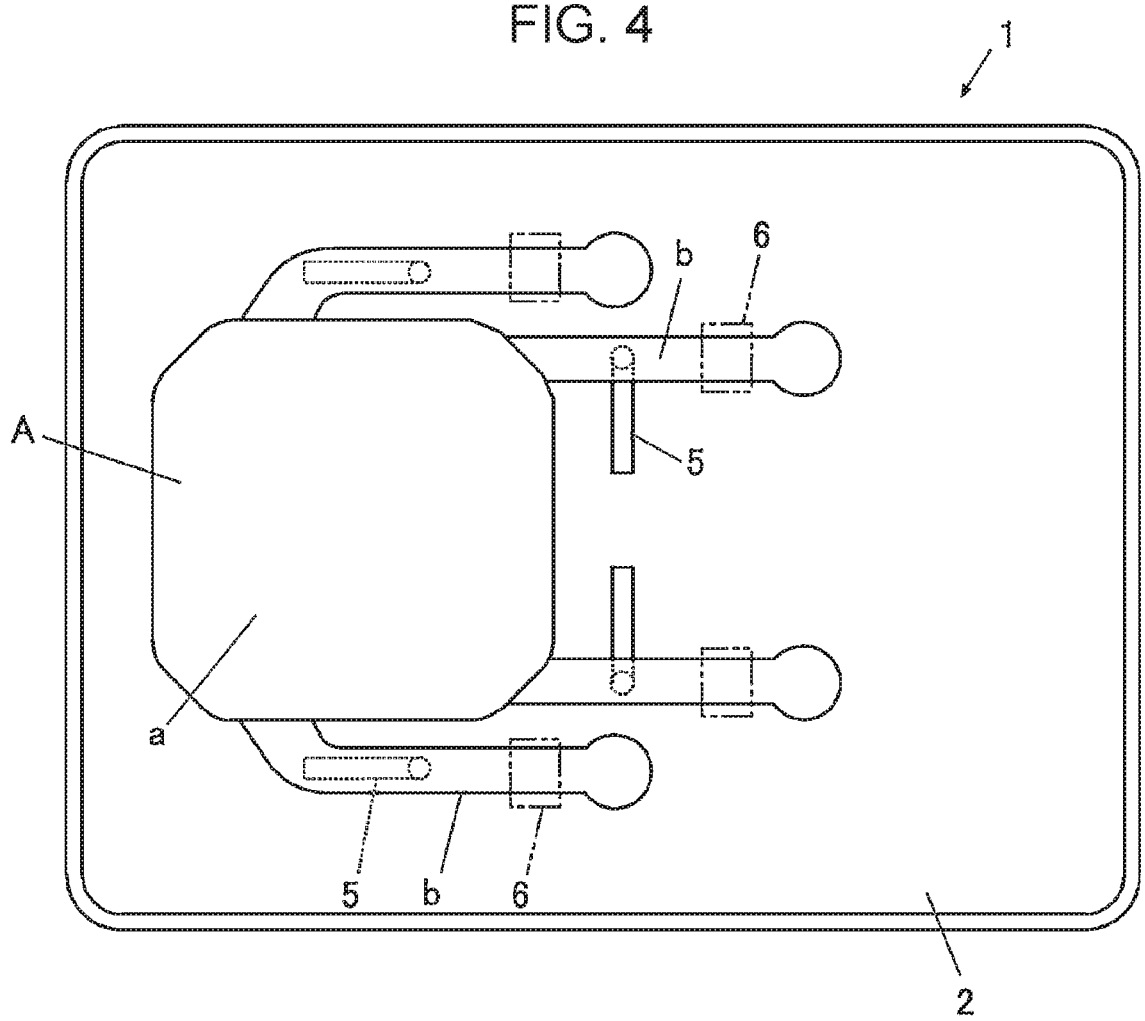
FIG. 4 illustrates a configuration example in which an unmanned vehicle is housed while respective arms of the unmanned vehicle are folded.

For another example, there is an unmanned vehicle housed such that respective arms b are folded as illustrated in FIG. 4. For still another example, although not illustrated, there is an unmanned vehicle housed in a vehicle-body carrying apparatus 1 in a state in which respective components are disassembled.

Even in such a case, in the state in which the respective arms b of the unmanned vehicle are folded or in the state in which the unmanned vehicle is disassembled into the respective components, vibration can be added to the vehicle body A (including the case of the disassembled respective parts) with the hammers 5 in a manner similar to the above, and the structural soundness can be diagnosed. FIG. 4 does not illustrate the lid 3, the informing device 8, the diagnostic device 7, and other components of the vehicle-body carrying apparatus 1.

In the above-described embodiment, the sensors 6 serving as the data collecting device are provided in the lid 3 of the vehicle-body carrying apparatus 1. However, for example, the sensors 6 may be embedded in advance in the vehicle body A of the unmanned vehicle, such as the arms b of the unmanned vehicle.

In this case, the diagnostic device 7 instructs the housed unmanned vehicle in a wired or wireless manner to activate the sensors 6, to cause hammering to be performed in this state, and to cause the sensors 6 to transmit data of vibration to the diagnostic device 7 in a wired or wireless manner.

Alternatively, a data collecting device can include a pressing unit provided in the housing 2, instead of or in addition to the above-described hammers 5, to press the vehicle body A, and a sensor 6 provided in the lid 3 or the like or embedded in the vehicle body A to measure displacement (stress, strain) generated by the pressing. In this case, for example, a strain gage may be used as the sensor.

In this case, the displacement that is measured by the sensor when the unmanned vehicle is structurally sound differs from that when the unmanned vehicle is not structurally sound. Thus, the diagnostic device 7 can diagnose the structural soundness of the vehicle body A based on the collected data of the displacement.

Alternatively, a data collecting device can include an exciting unit provided in the housing 2, instead of or in addition to the above-described hammers 5 or pressing unit, to excite ultrasound in the vehicle body A, and a sensor 6 provided in the lid 3 or the like or embedded in the vehicle body A to measure the ultrasound propagating through the vehicle body A.

Also in this case, the ultrasound that is measured by the sensor when the unmanned vehicle is structurally sound differs from that when the unmanned vehicle is not structurally sound. Thus, the diagnostic device 7 can diagnose the structural soundness of the vehicle body A based on the collected data of the ultrasound.

In the above-described embodiment, the vehicle-body carrying apparatus 1 is case-shaped and the user carries the vehicle-body carrying apparatus 1. However, for example, the vehicle-body carrying apparatus 1 may be installed on a vehicle or a ship, or may be permanently affixed to a vehicle or a ship.

The vehicle-body carrying apparatus 1 according to the embodiment of the disclosure is not necessarily portable by the user, and may have any form that simply houses and carries the vehicle body A of the unmanned vehicle.

Figure 5:
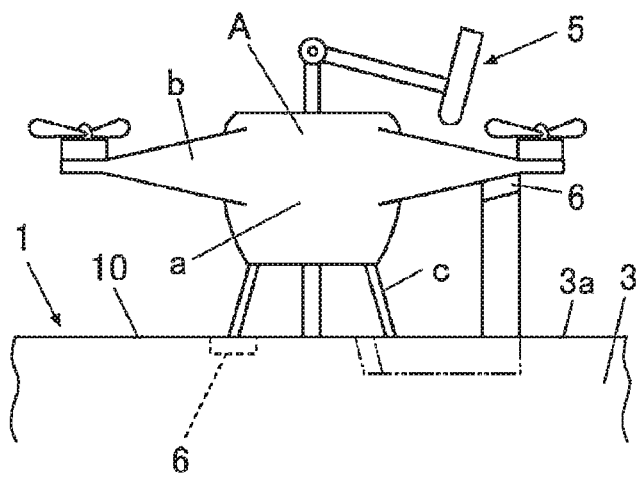
FIG. 5 illustrates a configuration example in which an upper surface of a lid of a vehicle-body carrying apparatus is used as a takeoff and landing area for an unmanned aerial vehicle.

When the unmanned vehicle is an unmanned aerial vehicle (UAV), as illustrated in FIG. 5, for example, an upper surface 3a or the like of a lid 3 of a vehicle-body carrying apparatus 1 may be used as a takeoff and landing area 10 for the unmanned aerial vehicle.

When the takeoff and landing area 10 for the unmanned aerial vehicle is provided on one surface of a casing of the vehicle-body carrying apparatus 1 (for example, the upper surface 3a of the lid 3), for example, a sensor 6 is disposed at a portion with which the vehicle body A (for example, leg c) of the unmanned aerial vehicle comes into contact, and/or a sensor 6 rises from the upper surface of the lid 3, to bring the sensor 6 into contact with the vehicle body A (main body a, arm b, leg c, or the like) of the unmanned aerial vehicle and to add vibration by hammering with the hammers 5.

Hence, the diagnostic device 7 (not illustrated in FIG. 5) can diagnose the structural soundness of the vehicle body A of the unmanned aerial vehicle based on the data of the vibration.

With this configuration, the unmanned aerial vehicle can be automatically diagnosed when the vehicle-body carrying apparatus 1 carries the vehicle body A of the unmanned aerial vehicle, and before the unmanned aerial vehicle takes off. Even when an abnormality appears in the structural soundness of the vehicle body A after the unmanned aerial vehicle is taken out from the vehicle-body carrying apparatus 1, the abnormality can be found.

The disclosure is not limited to the above-described embodiment and modifications, and can be modified within the scope of the disclosure.

For example, the hammers 5 are provided in the housing 2 and the sensors 6 are provided in the lid 3 in the above-described embodiment (see FIGS. 1 to 4). However, the hammers may be provided in the lid 3, and the sensors 6 may be provided in the housing 2. Alternatively, the hammers 5 and the sensors 6 may be provided in a common portion (for example, the housing 2) of the vehicle-body carrying apparatus 1.

In the above-described embodiment, the unmanned vehicle is lightweight and can be carried by a human. However, the unmanned vehicle may be heavyweight and may be carried by, for example, a crane, in a state housed in the vehicle-body carrying apparatus 1.

The invention claimed is:

1. A vehicle-body carrying apparatus configured to house and carry a vehicle body of an unmanned vehicle, the apparatus comprising:
   a housing capable of housing the vehicle body;
   a data collecting device configured to collect data relating to structural soundness of the vehicle body housed in the housing;
   a diagnostic device configured to diagnose the structural soundness of the vehicle body on a basis of the collected data; and
   an informing device configured to inform a user of a diagnostic result obtained by the diagnostic device,
   wherein the data collecting device comprises
   a hammer configured to perform hammering against the vehicle body, and
   a sensor configured to measure vibration generated in the vehicle body.

2. The vehicle-body carrying apparatus according to claim 1,
   wherein the data collecting device comprises
   a pressing unit configured to press the vehicle body, and
   a sensor configured to measure displacement generated in the vehicle body.

3. The vehicle-body carrying apparatus according to claim 2,
   wherein the data collecting device comprises
   an exciting unit configured to excite ultrasound in the vehicle body, and
   a sensor configured to measure ultrasound propagated through the vehicle body.

4. The vehicle-body carrying apparatus according to claim 3,
   wherein the unmanned vehicle is an unmanned aerial vehicle,
   wherein a takeoff and landing area for the unmanned aerial vehicle is provided on a surface of a casing of the vehicle-body carrying apparatus, and
   wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

5. The vehicle-body carrying apparatus according to claim 2,
   wherein the unmanned vehicle is an unmanned aerial vehicle,
   wherein a takeoff and landing area for the unmanned aerial vehicle is provided on a surface of a casing of the vehicle-body carrying apparatus, and
   wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

6. The vehicle-body carrying apparatus according to claim 1,
   wherein the data collecting device comprises
   an exciting unit configured to excite ultrasound in the vehicle body, and
   a sensor configured to measure ultrasound propagated through the vehicle body.

7. The vehicle-body carrying apparatus according to claim 6,
   wherein the unmanned vehicle is an unmanned aerial vehicle,
   wherein a takeoff and landing area for the unmanned aerial vehicle is provided on a surface of a casing of the vehicle-body carrying apparatus, and
   wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

8. The vehicle-body carrying apparatus according to claim 1,
   wherein the unmanned vehicle is an unmanned aerial vehicle,
   wherein a takeoff and landing area for the unmanned aerial vehicle is provided on a surface of a casing of the vehicle-body carrying apparatus, and
   wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

9. A vehicle-body carrying apparatus configured to house and carry a vehicle body of an unmanned vehicle, the apparatus comprising:
   a housing capable of housing the vehicle body;
   a data collecting device configured to collect data relating to structural soundness of the vehicle body housed in the housing;
   a diagnostic device configured to diagnose the structural soundness of the vehicle body on a basis of the collected data; and
   an informing device configured to inform a user of a diagnostic result obtained by the diagnostic device,
   wherein the data collecting device comprises
   a pressing unit configured to press the vehicle body, and
   a sensor configured to measure displacement generated in the vehicle body.

10. The vehicle-body carrying apparatus according to claim 9,
    wherein the data collecting device comprises
    an exciting unit configured to excite ultrasound in the vehicle body, and
    a sensor configured to measure ultrasound propagated through the vehicle body.

11. The vehicle-body carrying apparatus according to claim 10,
    wherein the unmanned vehicle is an unmanned aerial vehicle,
    wherein a takeoff and landing area for the unmanned aerial vehicle is provided on a surface of a casing of the vehicle-body carrying apparatus, and
    wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

12. The vehicle-body carrying apparatus according to claim 9,
wherein the unmanned vehicle is an unmanned aerial vehicle,
wherein a takeoff and landing area for the unmanned aerial vehicle is provided on a surface of a casing of the vehicle-body carrying apparatus, and
wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

13. A vehicle-body carrying apparatus configured to house and carry a vehicle body of an unmanned vehicle, the apparatus comprising:
a housing capable of housing the vehicle body;
a data collecting device configured to collect data relating to structural soundness of the vehicle body housed in the housing;
a diagnostic device configured to diagnose the structural soundness of the vehicle body on a basis of the collected data; and
an informing device configured to inform a user of a diagnostic result obtained by the diagnostic device,
wherein the data collecting device comprises
an exciting unit configured to excite ultrasound in the vehicle body, and
a sensor configured to measure ultrasound propagated that is to propagate through the vehicle body.

14. The vehicle-body carrying apparatus according to claim 13,
wherein the unmanned vehicle is an unmanned aerial vehicle,
wherein a takeoff and landing area for the unmanned aerial vehicle is provided on a surface of a casing of the vehicle-body carrying apparatus, and
wherein a sensor that constitutes the data collecting device is disposed in a portion of the takeoff and landing area with which the vehicle body of the unmanned aerial vehicle comes into contact, and/or the sensor rises from the surface so that the sensor comes into contact with the vehicle body of the unmanned aerial vehicle.

\* \* \* \* \*